United States Patent
Fransson

(10) Patent No.: US 8,940,107 B2
(45) Date of Patent: Jan. 27, 2015

(54) DISHWASHER, AND PROCESS FOR RINSING OF WASH ITEMS

(75) Inventor: Roger Fransson, Växjö (SE)

(73) Assignee: Wexiodisk AB, Vaxjo (SE)

( * ) Notice: Subject to any disclaimer, the term of this patent is extended or adjusted under 35 U.S.C. 154(b) by 602 days.

(21) Appl. No.: 12/998,997

(22) PCT Filed: Jan. 28, 2010

(86) PCT No.: PCT/SE2010/050082
§ 371 (c)(1), (2), (4) Date: Jun. 22, 2011

(87) PCT Pub. No.: WO2010/087763
PCT Pub. Date: Aug. 5, 2010

(65) Prior Publication Data
US 2011/0253173 A1    Oct. 20, 2011

(30) Foreign Application Priority Data
Jan. 30, 2009    (SE) ...................................... 0950032

(51) Int. Cl.
*A47L 15/42* (2006.01)
*A47L 15/00* (2006.01)

(52) U.S. Cl.
CPC ......... *A47L 15/4291* (2013.01); *A47L 15/0081* (2013.01)
USPC .................... 134/56 D; 134/103.2; 134/103.1

(58) Field of Classification Search
CPC ............ A47L 15/4291; A47L 15/0081; A47L 15/4225
USPC ...... 134/56 D, 103.1, 103.2, 104.2, 109, 186, 134/60
See application file for complete search history.

(56) References Cited

U.S. PATENT DOCUMENTS

| 5,617,885 | A | * | 4/1997 | Centis .......................... 134/58 D |
| 5,829,459 | A | * | 11/1998 | Milocco et al. ............. 134/57 D |
| 7,469,704 | B2 | | 12/2008 | Fransson |
| 2005/0211277 | A1 | * | 9/2005 | Fransson ..................... 134/56 D |

FOREIGN PATENT DOCUMENTS

| DE | 1270239 B | 6/1968 |
| DE | 2615846 A1 | 10/1977 |

(Continued)

OTHER PUBLICATIONS

International Search Report.

*Primary Examiner* — Michael Kornakov
*Assistant Examiner* — Katelyn Whatley
(74) *Attorney, Agent, or Firm* — Harness, Dickey & Pierce P.L.C.

(57) ABSTRACT

A dishwasher (10) for the batch washing of wash items (20) comprises a wash chamber (24), which is arranged to accommodate wash items (20) and in which spray members ((34a-b)) for spraying out washing liquid and rinsing liquid are disposed; a wash tank (28), which is arranged to contain washing liquid which during a wash phase shall be supplied to the wash chamber (24) via the spray members ((34a-b)); a recirculating rinse tank (52), which is arranged to contain used rinsing liquid which during a rinse phase shall be supplied to the wash chamber (24) via the spray members ((34a-b)); members (62) for supplying final-rinse liquid which during a final-rinse phase shall be supplied to the wash chamber (24) via the spray members ((34a-b)); a collecting device (42, 46), which is arranged to collect liquid which has been sprayed out into the wash chamber (24) via the spray members ((34a-b)); and a pump (48), which is arranged to pump used rinsing liquid from the collecting device (42, 46) to the recirculating rinse tank (52).

14 Claims, 3 Drawing Sheets

(56) References Cited

FOREIGN PATENT DOCUMENTS

| JP | 2009056425 A | 3/2009 |
| WO | WO-03101275 A1 | 12/2003 |
| WO | WO-2005020782 A1 | 3/2005 |

* cited by examiner

DISHWASHER, AND PROCESS FOR RINSING OF WASH ITEMS

FIELD OF THE INVENTION

The present invention relates to a dishwasher for the batch washing of wash items, wherein the dishwasher comprises a wash chamber with spray members for spraying out washing liquid and rinsing liquid; a wash tank for washing liquid; a recirculating rinse tank for used rinsing liquid; members for the supply of final-rinse liquid; and a collecting device, which is arranged to collect liquid which has been sprayed out into the wash chamber via the spray members. The present invention also relates to a process for the rinsing of wash items.

TECHNICAL BACKGROUND

A washing operation for washing soiled wash items, for example kitchen utensils in the form of plates, glasses, cutlery, saucepans, usually comprises the steps:

washing of the wash items with a detergent-containing washing liquid rinsing of the wash items with a rinsing liquid so that residues of the washing liquid, and any food remnants in the washing liquid, shall be rinsed away.

For an effective rinse, the rinsing liquid is often heated. In addition, it is normal for it to contain a drying agent, which reduces the surface tension of the rinsing liquid and thus makes it easier for the rinsing liquid to run off the wash items after the rinse. The consumption of rinsing liquid, and, where appropriate, of rinsing liquid chemicals such as drying agent, as well as of energy for heating the rinsing liquid, accounts for an appreciable share of the operating costs for a dishwasher.

WO2005/020782 describes a dishwasher with reduced rinsing liquid consumption. This is achieved by the dishwasher in WO2005/020782 being provided with a collecting device for used rinsing liquid, and with a recirculating rinse tank having an inlet connected to the collecting device. The collected rinsing liquid is used to rinse the wash items in a pre-rinse phase, whereafter a final rinse of the wash items is realized with new, clean final-rinse liquid in a final-rinse phase. A float valve with delayed opening ensures that the very first pre-rinse liquid, which is dirtiest, is not allowed to enter the recirculating rinse tank, but instead runs down into the wash tank.

SUMMARY OF THE INVENTION

One object of the invention is to reduce the consumption of rinsing liquid. This object is achieved with the aid of a dishwasher for the batch washing of wash items, the dishwasher comprising a wash chamber, which is arranged to accommodate wash items and in which spray members for spraying out washing liquid and rinsing liquid are disposed; a wash tank, which is arranged to contain washing liquid which during a wash phase shall be supplied to the wash chamber via the spray members; a recirculating rinse tank, which is arranged to contain used rinsing liquid which during a rinse phase shall be supplied to the wash chamber via the spray members; members for the supply of final-rinse liquid which during a final-rinse phase shall be supplied to the wash chamber via the spray members; a collecting device, which is arranged to collect liquid which has been sprayed out into the wash chamber via the spray members; and a pump, which is arranged to pump used rinsing liquid from the collecting device to the recirculating rinse tank. By virtue of the fact that a pump is arranged to pump used rinsing liquid from the collecting device to the recirculating rinse tank, it is possible to relinquish an accurately controllable quantity of first rinsing liquid. The reused rinsing liquid can hence be kept cleaner, so that it is sufficient to supply a lesser quantity of clean final-rinse liquid. The quantity of rinsing liquid which is relinquished can also easily be varied in dependence on the chosen wash program, the number of dishes for which the washing liquid in the wash tank has been used, etc. By virtue of the invention, it is also possible to, with greater accuracy, clear space in the recirculating rinse tank for the final-rinse liquid, which reduces the risk of some of the collected final-rinse liquid being deprived of space in the recirculating rinse tank. This too helps to keep the reused rinsing liquid cleaner. All in all, the invention saves on rinsing liquid, as well as, where appropriate, on heating energy and rinsing liquid chemicals, for example drying agent. This implies, of course, both economic and environmental advantages. The advantages of the invention can also, of course, be realized in the form of a better wash result, i.e. cleaner dishes, instead of, or in combination with, the above-stated economic and environmental savings.

In one embodiment, the dishwasher is arranged to begin pumping used rinsing liquid from the collecting device to the recirculating rinse tank after the wash items have been rinsed with rinsing liquid from the recirculating rinse tank for at least 3 seconds. This has proved to be a suitable rough-rinsing time for the dirtiest washing liquid to manage to be rinsed properly out of the wash chamber.

In one embodiment, the wash tank is situated beneath the wash chamber, and the collecting device comprises a collecting plate, which is inclined relative to a horizontal plane and which forms a lower limit surface for the wash chamber and is provided with an opening via which the wash chamber communicates with the wash tank, the wash tank being arranged to receive used washing liquid and rinsing liquid from the wash chamber via the collecting device and the said opening. This embodiment can be realized with few moving parts, and the fact that the, relatively speaking, cleaner rinsing liquid is allowed to dilute the, relatively speaking, dirtier washing liquid enables the washing operation to be shortened and/or rinsing liquid saved. Preferably, the collecting device comprises a trough extending along the periphery of the opening and the pump is connected to an outlet, disposed in the trough, for used rinsing liquid. This embodiment produces an effective collection with few moving parts. Preferably, the trough is inclined relative to the horizontal plane and the outlet of the trough is situated in the lowest portion of the trough. A greater recirculating flow can thereby be achieved.

In one embodiment, the recirculating rinse tank is provided with an overflow for rinsing liquid. Hence it is always possible to pump the last, and therefore cleanest, rinsing water into the recirculating rinse tank, regardless of how full it is. Preferably, the overflow for rinsing liquid emerges in or above the wash tank. The rinsing liquid is hence reused as washing liquid.

In one embodiment, the recirculating rinse tank is provided with a liquid level sensor. Such a sensor makes it easier to adjust the quantity of final-rinse liquid in a final-rinse phase to the space in the recirculating rinse tank, and vice versa.

In one embodiment, the wash chamber is delimited at the top by a raisable and lowerable hood.

According to another aspect of the invention, the object is achieved with the aid of a process for the batch rinsing of washed wash items in a wash chamber in a dishwasher, wherein the process comprises rinsing of the wash items with used rinsing liquid from a recirculating rinse tank in a rough-rinse phase; rinsing of the wash items with used rinsing liquid from a recirculating rinse tank in a recirculating rinse phase; rinsing of the wash items with final-rinse liquid in a final-rinse phase; and collection of rinsing liquid used in the recirculating rinse phase and the final-rinse phase, the process comprising the pumping of collected rinsing liquid to the recirculating rinse tank. As a result of this process, it is possible to relinquish an accurately controllable quantity of the first rinsing liquid which is used in the rough-rinse phase. The reused rinsing liquid can hence be kept cleaner, so that it is sufficient to supply a lesser quantity of clean final-rinse liquid. By virtue of the invention, it is also possible to, with greater accuracy, clear space in the recirculating rinse tank for the final-rinse liquid, which reduces the risk of some of the collected final-rinse liquid being deprived of space in the recirculating rinse tank. This too helps to keep the reused final-rinse liquid cleaner. All in all, the invention saves on rinsing liquid, as well as, where appropriate, on heating energy and rinsing liquid chemicals, for example drying agent. Preferably, the pumping of collected rinsing liquid is begun no sooner than at least three seconds after the commencement of the rough-rinse phase.

In one embodiment, the rinsing water used in the rough-rinse phase is led to a wash tank.

BRIEF DESCRIPTION OF THE DRAWINGS

The invention will be described in greater detail below with the aid of a preferred, but non-limiting embodiment and with reference to the appended drawings.

DESCRIPTION OF PREFERRED EMBODIMENTS

Figure 1:
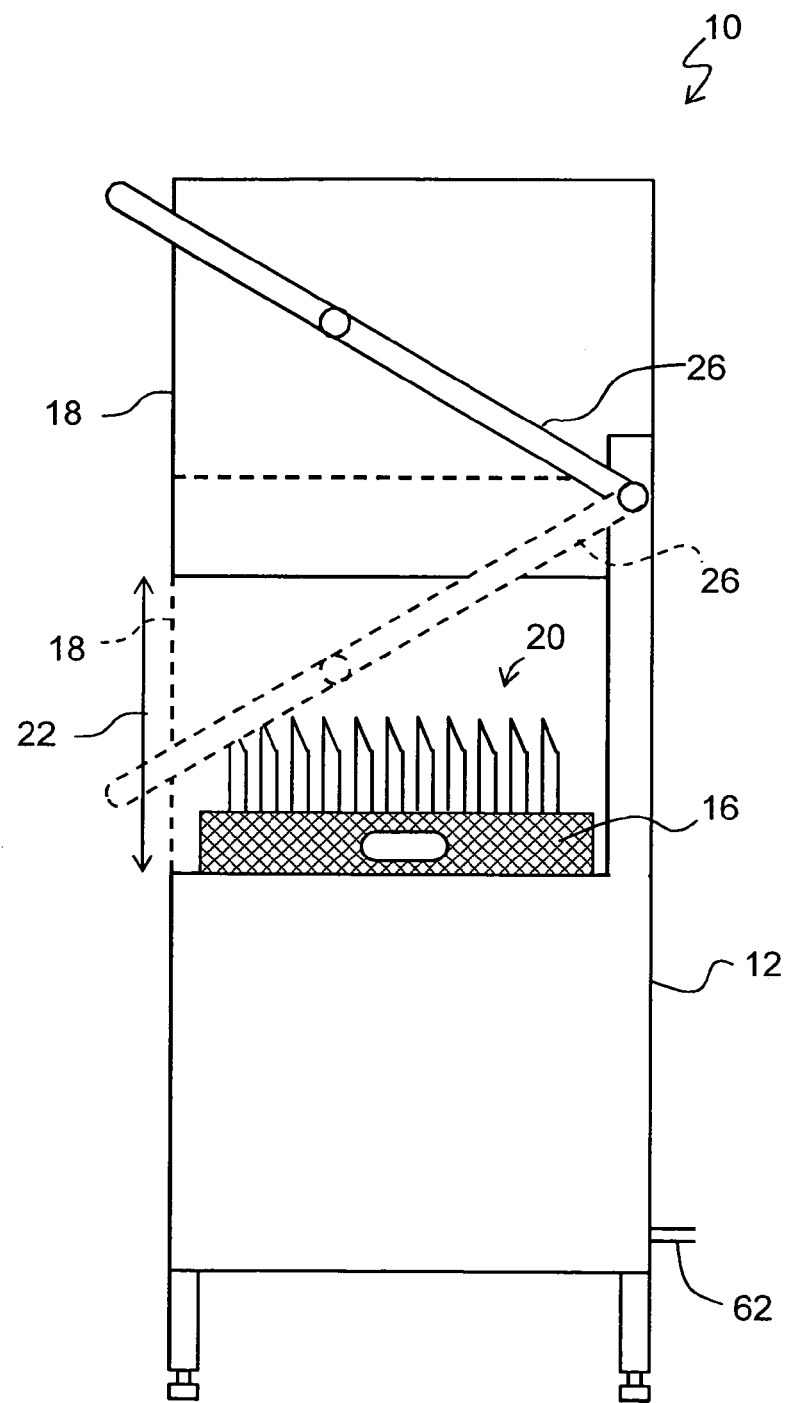
FIG. 1 is a schematic side view of a dishwasher.
Figure 2:
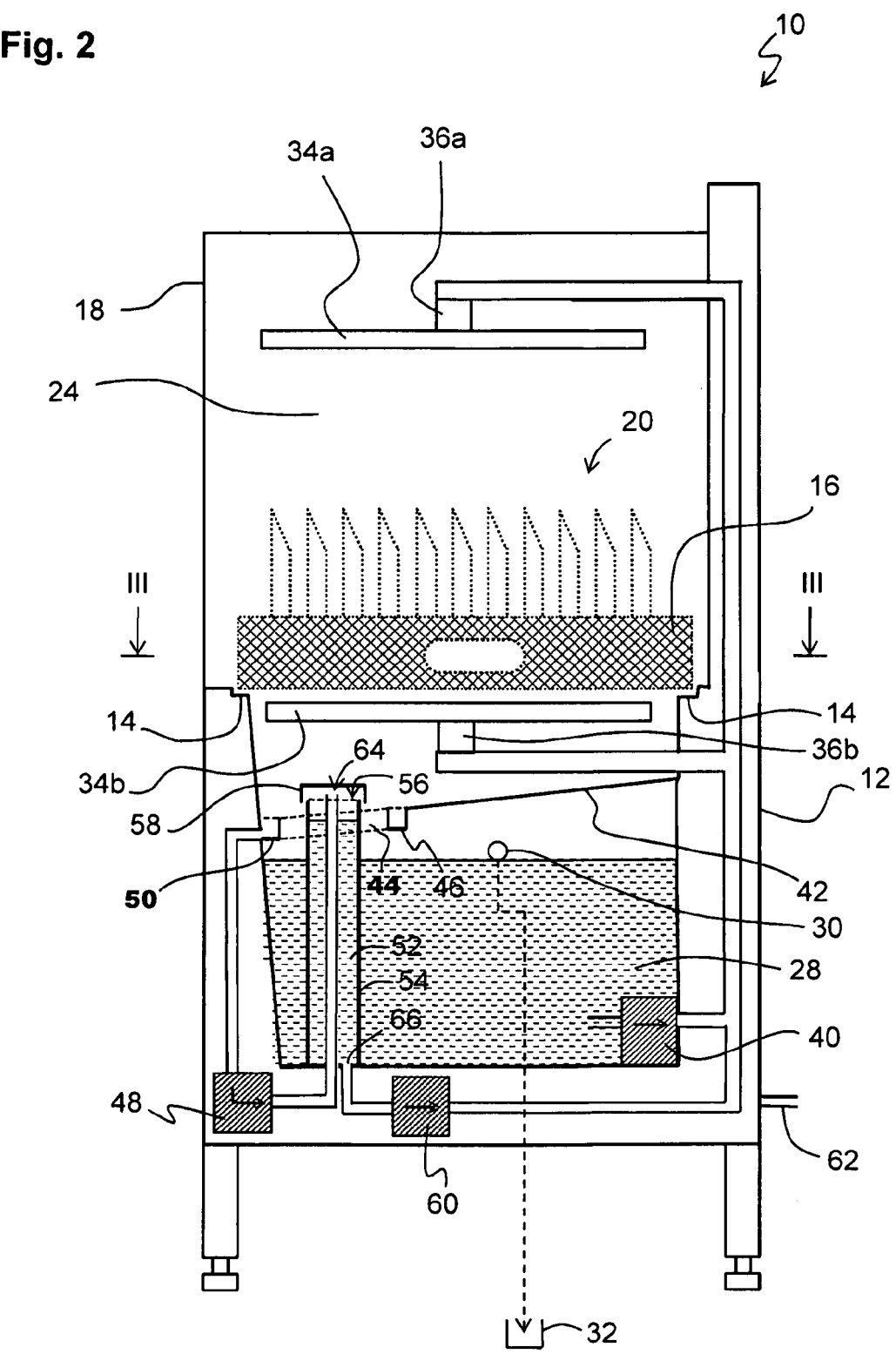
FIG. 2 is a sectional view of the dishwasher in FIG. 1.

FIG. 1 shows an example of an embodiment of a dishwasher for the washing and rinsing of wash items. The dishwasher 10 has a frame 12, which is provided with lips 14 (FIG. 2) arranged to support a wash basket 16 of standard 500 mm width. A raisable and lowerable hood 18 is arranged to, in raised position (unbroken line), allow the wash basket 16 containing soiled wash items 20 to be introduced into the machine 10 via a hood gap 22 and placed on the lips 14. In the lowered position (dashed line), the hood 18 is arranged to shut tight against the frame 12, and thereby form a closed wash chamber 24 (FIG. 2). The hood 18 is arranged to be raised and lowered with a control member 26.

FIG. 2 is a sectional view of the dishwasher 10. The machine 10 is shown with the hood 18 in the lowered position. The frame 12 comprises a wash tank 28, which contains washing liquid in the form of, for example, water mixed with detergent, up to a level determined by an overflow pipe 30. The overflow pipe 30 is connected to a drain 32 in a non-illustrated manner.

An upper horizontal spraying arm 34a is situated on an upper part of the frame 12, and is rotatable about a substantially vertical axis 36a. The upper spraying arm 34a is provided with a plurality of nozzles (not shown), which are directed downwards to spray out washing and rinsing liquid towards the wash items 20 from above. A lower horizontal spraying arm 34b is situated beneath the lips 14, and it too is rotatable about a substantially vertical axis 36b. The lower horizontal spraying arm 34b is provided with a plurality of nozzles 38b (FIG. 3), which are directed upwards to spray out washing and rinsing liquid towards the wash items 20 from below. A wash pump 40 is arranged to pump washing liquid from the wash tank 28 to the spraying arms 34a-b. In the bottom of the wash tank 28 is found a bottom valve (not shown), which is connected to the drain 32 for emptying of the wash tank 28, for example at the end of the working day or when it is wished to clean or service the machine 10.

A collecting plate 42, for collecting washing and rinsing liquid which has been sprayed out from the spraying arms 34a-b, covers the majority of the bottom of the wash chamber 24, and inclines downwards towards an opening 44 (FIG. 3) in the collecting plate 42, through which opening 44 the wash chamber 24 communicates with the wash tank 28. Running around the opening 44 is a collecting trough 46 with sloping bottom. A recovery pump 48 for used rinsing liquid is connected to a rinsing liquid outlet 50 at the lowest point of the collecting trough 46. The recovery pump 48 is arranged to not be activated during the washing of the wash items 20. The washing liquid which during a wash phase is sprayed out into the wash chamber 24 by means of the spraying arms 34a-b will hence be collected by the collecting plate 42, spill over the collecting trough 46, and run down into the wash tank 28 via the opening 44.

The recovery pump 48 is arranged to, when activated, pump liquid from the outlet 50 of the collecting trough 46 to a circular-cylindrical recirculating rinse tank 52, which is situated in the wash tank 28. The recirculating rinse tank 52 is delimited by a wall 54, which extends up above the overflow 30 of the wash tank 28. In addition, the recirculating rinse tank 52 is provided at the top with an opening 56, so that rinsing liquid can spill over the upper edge of the wall 54 and run out into the wash tank. The opening 56 is covered by a cap 58, which allows overspill from the recirculating rinse tank 52 down into the wash tank 28, at the same time as it prevents liquid from the wash chamber 24 from being washed down into the recirculating rinse tank 52 from above.

A recirculating rinse pump 60 is arranged to pump used rinsing liquid from the recirculating rinse tank 52 to the spraying arms 34a-b. In addition, the dishwasher 10 is provided with an inlet 62 for clean final-rinse liquid, and a final-rinse pump (not shown) for pumping the clean final-rinse liquid to the spraying arms 34a-b during a final-rinse phase.

The outlet 64 of the recovery pump 48 emerges in an upper portion of the recirculating rinse tank 52, and the inlet 66 of the recirculating rinse pump 60 emerges in a lower portion of the recirculating rinse tank 52. The last collected rinsing liquid will hence be that which is last pumped to the spraying arms 34a-b with the recirculating rinse pump 60. This means that the very last used final-rinse liquid, which also is cleanest, will not be sprayed out from the spraying arms 34a-b during a first rough-rinse phase in a next washing operation, but is saved for a recirculating rinse phase, and thus is at least partially recovered.

An alternative embodiment would be to have the outlet of the recovery pump 48 emerge in a lower portion of the recirculating rinse tank 52, and to have the inlet of the recirculating rinse pump 60 emerge in an upper portion of the recirculating rinse tank 52. This embodiment means, on the one hand, that a minimum of the last recovered rinsing liquid is lost in the event of any overflowing of the recirculating rinse tank 52, yet, on the other hand, that it is necessary to ensure that there is a sufficient quantity of rinsing liquid present in the recirculating rinse tank 52 during the rough-rinse and recirculating rinse phases.

The recirculating rinse tank is further provided with a liquid level sensor (not shown) for measuring the quantity of rinsing liquid in the recirculating rinse tank. The quantity of final-rinse liquid which is sprayed out via the spraying arms 34a-b in a final-rinse phase can hence easily be adjusted to the vacant space in the recirculating rinse tank 52, so that none or only a little of the collected, relatively clean final-rinse liquid spills over the recirculating rinse tank 52 and down into the wash tank 28. Conversely, the liquid level sensor can also be used, during a recirculating rinse phase, to provide adequate space in the recirculating rinse tank 52 for a certain predetermined quantity of used final-rinse liquid for collection in a final-rinse phase.

The dishwasher 10 can also be provided with a filter (not shown) in the opening 44 between the wash chamber 24 and the wash tank 28. Any food remnants in the washing liquid can hence be collected and removed effectively.

Figure 3:
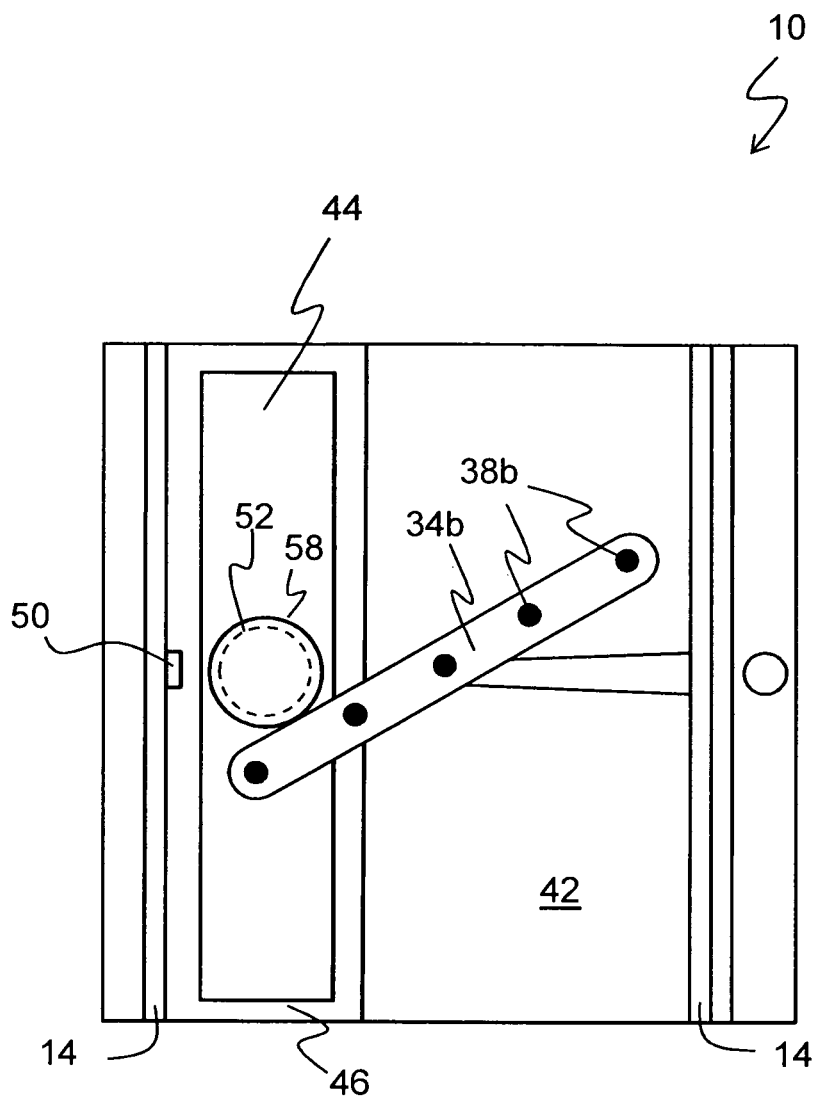
FIG. 3 is a view of the section III-III in FIG. 2.

FIG. 3 is a view of the section III-III in FIG. 2. For reasons of clarity, the wash basket 16 and the wash items 20 are not shown. The view shows the lips 14, the lower spraying arm 34b, the collecting plate 42, the opening 44, the collecting trough 46, the outlet 50 of the trough 46, and the cap 58 over the recirculating tank 52 (dashed).

The dishwasher in FIGS. 1-3 is arranged to execute a washing operation as follows:

First the wash items are washed in a wash phase, during which washing liquid is pumped from the wash tank 28 to the spraying arms 34a-b with the aid of the wash pump 40. The washing liquid is sprayed onto the wash items 20 with the aid of the spraying arms 34a-b and is subsequently allowed to run back down into the wash tank 28 via the collecting trough 46, which overflows. The wash phase continues for about 90 seconds; during this time, washing liquid circulates between the wash chamber 24 and the wash tank 28.

The wash phase is followed by a short pause of about 8 seconds to allow washing liquid to run off the wash items.

After this, the wash items 20 are rinsed in a rough-rinse phase, during which used rinsing liquid from the recirculating rinse tank 52 is pumped to the spraying arms 34a-b with the aid of the recirculating rinse pump 60. The rinsing liquid from the recirculating rinse tank 52 is sprayed onto the wash items 20 with the aid of the spraying arms 34a-b and is subsequently allowed to run down into the wash tank 28 via the collecting trough 46, which overflows. The rinsing liquid which is used during the rough-rinse phase will rinse most of the wash water remaining in the wash chamber 24 and the collecting trough 46 down into the wash tank 28. The rough-rinse phase continues for about 5 seconds.

There then follows a recirculating rinse phase, during which used rinsing liquid from the recirculating rinse tank 52 is pumped to the spraying arms 34a-b with the aid of the recirculating rinse pump 60. The rinsing liquid from the recirculating rinse tank 52 is sprayed onto the wash items 20 with the aid of the spraying arms 34a-b and is subsequently led via the collecting plate 42 to the collecting trough 46. The recovery pump 48 is active during the recirculating rinse phase and pumps back collected, used rinsing liquid from the collecting trough 46 to the recirculating rinse tank 52. A certain quantity of rinsing liquid can also run from the wash chamber 24 down into the wash tank 28 via the opening 44.

During a final-rinse phase, clean final-rinse liquid is pumped from the inlet 62 for final-rinse liquid to the spraying arms 34a-b with the aid of the final-rinse pump (not shown). The rinsing liquid from the inlet 62 is sprayed onto the wash items 20 with the aid of the spraying arms 34a-b and is subsequently led via the collecting plate 42 to the collecting trough 46. The recovery pump 48 is active during the final-rinse phase and pumps collected, used final-rinse liquid from the collecting trough 46 to the recirculating rinse tank 52.

The recovery pump 48 is arranged to be active for about 10 more seconds following the conclusion of the final-rinse. Hence, the last, clean final-rinse liquid which runs off the wash items 20 after the final-rinse is also recovered.

The first rinsing liquid which is used in the rough-rinse phase will be mixed during the rough-rinse with the dirty washing liquid remaining on the wash items 20 and in the collecting trough 46. The inactivity of the recovery pump 48 during the rough-rinse phase means that this first rinsing liquid is not recovered, but is instead allowed to dilute the washing liquid. A certain quantity of detergent should therefore be added to the washing liquid prior to the next washing operation to compensate for the dilution.

To sum up, a dishwasher with a recirculating rinse tank has been described above, wherein the dishwasher is arranged to execute a washing operation comprising at least the following phases:
  a wash phase, in which washing liquid bathes the wash items;
  a rough-rinse phase, during which used rinsing liquid from the recirculating rinse tank bathes the wash items, but is not returned to the recirculating rinse tank;
  a recirculating rinse phase, during which used rinsing liquid from the recirculating rinse tank bathes the wash items, is collected and pumped to the recirculating rinse tank; and
  a final-rinse phase, in which the final-rinse liquid bathes the wash items, is collected and pumped to the recirculating rinse tank.

It will be appreciated that the invention can be variously modified within the scope of the patent claims. For example, it is not necessary that the member for supplying final-rinse liquid shall comprise a connection on the outer side of the dishwasher 10. The member for supplying final-rinse liquid can equally well comprise a tank for final-rinse liquid inside the machine; this tank can be arranged to be filled up arbitrarily at any time prior to, during or after a final-rinse, and the machine can be arranged to automatically supply chemical additives and heat to the rinsing liquid in this tank.

Even though the spray members in the shown example are used for both washing and rinsing liquid, it is possible, of course, to have separate spray members for washing liquid and rinsing liquid. The dishwasher can also, for example, be provided with separate spray members for used rinsing liquid and final-rinse liquid.

Nor is it necessary for the wash chamber 14 to be delimited by a raisable and lowerable hood; the dishwasher can equally well be of the front-loaded type.

The invention claimed is:

1. A dishwasher for batch-wise washing of wash items, comprising:
  a wash chamber, arranged to accommodate wash items and in which at least one sprayer, to spray out washing liquid and rinsing liquid, is disposed;
  a wash tank, arranged to contain washing liquid which, during a wash phase, is supplied to the wash chamber via the at least one sprayer;
  a recirculating rinse tank, arranged to contain used rinsing liquid which, during a rinse phase, is supplied to the wash chamber via the at least one sprayer; wherein the recirculating rinse tank is provided with an opening at a to thereof so that rinsing liquid can spill over an upper edge of the opening and run out into the wash tank, the opening of the recirculating rinse tank is covered by a cap, which allows overspill from the recirculating rinse tank down into the wash tank while at the same time, the cap prevents liquid from the wash chamber from being washed down into the recirculating rinse tank from above;

supplier to supply final-rinse liquid which, during a final-rinse phase, is supplied to the wash chamber via the at least one sprayer; and a collecting device, arranged to collect liquid which has been sprayed out into the wash chamber via the at least one sprayer; and a pump, arranged to pump used rinsing liquid from the collecting device to the recirculating rinse tank.

2. The dishwasher according to claim 1, wherein the dishwasher is arranged to begin pumping of used rinsing liquid from the collecting device to the recirculating rinse tank after the wash items have been rinsed with rinsing liquid from the recirculating rinse tank for at least 3 seconds.

3. The dishwasher according to claim 1, wherein the wash tank is situated beneath the wash chamber, and wherein the collecting device includes a collecting plate, inclined relative to a horizontal plane and which defines a lower limit surface of the wash chamber and is provided with an opening via which the wash chamber communicates with the wash tank, the wash tank being arranged to receive used washing liquid and rinsing liquid from the wash chamber via the collecting device and the said opening.

4. The dishwasher according to claim 3, wherein the collecting device comprises a trough extending along the periphery of the opening and the pump is connected to an outlet, disposed in the trough, for used rinsing liquid.

5. The dishwasher according to claim 4, wherein the trough is inclined relative to the horizontal plane and the outlet of the trough is situated in a relatively lowest portion of the trough.

6. The dishwasher according to claim 1, wherein the recirculating rinse tank is provided with an overflow for rinsing liquid.

7. The dishwasher according to claim 6, wherein the overflow for rinsing liquid emerges in or above the wash tank.

8. The dishwasher according to claim 1, wherein the recirculating rinse tank is provided with a liquid level sensor.

9. The dishwasher according to claim 1, wherein the wash tank includes an overflow to determine a level of washing liquid.

10. The dishwasher according to claim 9, wherein the recirculating rinse tank extends above the overflow in the wash tank.

11. The dishwasher according to claim 1, wherein the recirculating rinse tank has a circular-cylindrical shape.

12. The dishwasher according to claim 1, wherein the sprayer includes an upper spraying arm to direct downwardly to spray out washing and rinsing liquid towards the wash items from above, and a lower spraying arm to direct upwardly to spray out washing and rinsing liquid towards the wash items from below.

13. The dishwasher according to claim 1, wherein the collecting device covers a substantial portion of a bottom of the wash chamber, and inclines downwards towards an opening in the collecting plate.

14. The dishwasher according to claim 1, further comprising an inlet for final-rinse liquid to be applied to the at least one sprayer.

* * * * *